(12) United States Patent
Wu et al.

(10) Patent No.: US 7,864,397 B2
(45) Date of Patent: Jan. 4, 2011

(54) CURABLE ELECTROLYTE

(75) Inventors: Junjun Wu, Woodbury, MN (US); Brian T. Weber, St. Anthony, MN (US); Duane D. Fansler, Dresser, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 1065 days.

(21) Appl. No.: 11/566,509

(22) Filed: Dec. 4, 2006

(65) Prior Publication Data

US 2008/0131771 A1 Jun. 5, 2008

(51) Int. Cl.
*G02F 1/15* (2006.01)
(52) U.S. Cl. .................. 359/265; 359/270; 359/272
(58) Field of Classification Search .................. 359/265
See application file for complete search history.

(56) References Cited

U.S. PATENT DOCUMENTS

| | | | |
|---|---|---|---|
| 4,893,908 A | 1/1990 | Wolf et al. | |
| 4,908,283 A | 3/1990 | Takahashi et al. | |
| 5,009,970 A | 4/1991 | Kronfli et al. | |
| 5,598,293 A | 1/1997 | Green | |
| 5,825,526 A | 10/1998 | Bommarito et al. | |
| 5,897,974 A * | 4/1999 | LaFleur | 429/309 |
| 5,919,571 A | 7/1999 | Badding et al. | |
| 5,922,493 A | 7/1999 | Humphrey et al. | |
| 5,958,997 A | 9/1999 | Eunkyoung et al. | |
| 6,013,172 A | 1/2000 | Chang et al. | |
| 6,096,234 A | 8/2000 | Nakanishi et al. | |
| 6,132,906 A | 10/2000 | Nishimura et al. | |
| 6,301,038 B1 | 10/2001 | Fitzmaurice et al. | |
| 6,361,709 B1 | 3/2002 | Bauer et al. | |
| 6,395,367 B1 * | 5/2002 | Michot et al. | 428/64.8 |
| 6,627,099 B2 | 5/2003 | Ono et al. | |
| 6,620,342 B1 | 9/2003 | Burchill et al. | |
| 6,645,675 B1 | 11/2003 | Munshi | |
| 6,680,147 B2 | 1/2004 | Lee | |
| 6,833,219 B2 | 12/2004 | Lee et al. | |
| 7,008,564 B2 | 3/2006 | Harrup et al. | |
| 7,135,254 B2 | 11/2006 | Yun et al. | |
| 7,586,663 B1 * | 9/2009 | Radmard et al. | 359/265 |
| 2003/0228523 A1 | 12/2003 | DeLongchamp et al. | |
| 2003/0232240 A1 | 12/2003 | Lee et al. | |

(Continued)

FOREIGN PATENT DOCUMENTS

EP 608203 B1 7/1994

OTHER PUBLICATIONS

Adi et al., "Solid-state photoelectrochemical device based on poly(3-hexylthiophene) and an ion conducting polymer electrolyte, amorphous poly(ethylene oxide) complexed with $I_3^-/I^-$ redox couple", Solar Energy Materials & Solar Cells, vol. 83 (2004) pp. 301-310.

(Continued)

*Primary Examiner*—Jessica T Stultz

(57) ABSTRACT

An electrolyte composition is described. The electrolyte composition includes at least one ionic compound; at least one polar solvent; at least one polymerizable material; at least one nanoparticle based viscosity modifier; at least one chain transfer agent; and at least one initiator. Also described are electrochromic articles and devices including an electrolyte layer including an electrolyte composition. Methods of assembling an electrochromic article are also included.

26 Claims, 4 Drawing Sheets

U.S. PATENT DOCUMENTS

2008/0020007 A1* 1/2008 Zang .......................... 424/401

OTHER PUBLICATIONS

Edelmann, K. and Sander B., "Polymer gel electrolytes synthesized by photopolymerization in the presence of star-shaped oligo(ethylene glycol) ethers (OEGE)", Polymer, vol. 46 (2005) pp. 397-406.

Fu et al., "The effect of fumed silica on the interfacial stability in the polymer gel electrolyte", Materials Letters, vol. 57 (2003) 1759-1764.

Kang et al., "Dye-Sensitized $TiO_2$ Solar Cells Using Polymer Gel Electrolytes Based on PVdF-HFP", Journal of The Electrochemical Society, vol. 151 (2004), pp. E257-E260.

Kim et al., "Electrochemical properties of the Li-ion polymer batteries with P(VdF-co-HFP)-based gel polymer electrolyte", Journal of Power Sources 141 (2005) pp. 293-297.

Nishimoto et al., "High Ionic Conductivity of Polyether-Based Network Polymer Electrolytes with Hyperbranched Side Chains", Macromolecules, vol. 32 (1999) 1541-1548.

Qiu et al., "Novel preparation of nanocomposite polymer electrolyte and its application to lithium polymer batteries", Journal of Power Sources, vol. 138 (2004) pp. 245-252.

Su et al., "All solid-state electrochromic device with PMMA gel electrolyte", Materials Chemistry and Physics, vol. 52 (1998), pp. 180-183.

U.S. Appl. No. 11/566,548, entitled "Electrochromic Device", filed Dec. 4, 2006.

U.S. Appl. No. 11/566,541, "Electrochromic Device Based on Layer by Layer Deposition", filed Dec. 4, 2006.

Varshney et al. "Photo-polymerized films of lithium ion conducting solid polymer electrolyte for electrochromic windows (ECWs)", Solar Energy Materials & Solar Cells, vol. 79 (2003) 449-458.

Yoshimoto et al., "A novel polymeric gel electrolyte systems containing magnesium salt with ionic liquid", Electrochimicha Acta 50 (2005) pp. 3866-3871.

* cited by examiner

CURABLE ELECTROLYTE

BACKGROUND

Electrochromic devices include an electrolyte layer. Normally, glass based electrochromic devices utilize liquid electrolytes because fast ionic transport (conductivity greater than 10 mS/cm) is desired. To improve device stability, especially in flexible electrochromic devices, gel or solid electrolytes would be preferred. However, devices using solid and gel electrolytes often suffer from low device performance due to reduced ionic conductivity. Therefore, there remains a need for electrolytes for electrochromic devices that offer stability but do not compromise device performance.

BRIEF SUMMARY

Described is an electrolyte composition that includes at least one ionic compound, at least one polar solvent, at least one polymerizable material, at least one nanoparticle based viscosity modifier, at least one chain transfer agent, and at least one initiator.

Described is an electrochromic article that includes a working electrode, and an electrolyte layer that includes an electrolyte composition having at least one ionic compound, at least one polar solvent, at least one polymerizable material, at least one nanoparticle based viscosity modifier, at least one chain transfer agent, and at least one initiator, wherein the electrolyte layer is on the working electrode.

Described is a method of assembling an electrochromic device that includes the steps of providing an electrolyte composition having at least one ionic compound, at least one polar solvent, at least one polymerizable material, at least one nanoparticle based viscosity modifier, at least one chain transfer agent, and at least one initiator; coating the electrolyte composition onto a working surface of a working electrode, providing a counter electrode having a working surface, and assembling the electrochromic device by placing the electrolyte composition coated working surface of the working electrode in contact with the working surface of the counter electrode.

DETAILED DESCRIPTION

Figure 1:
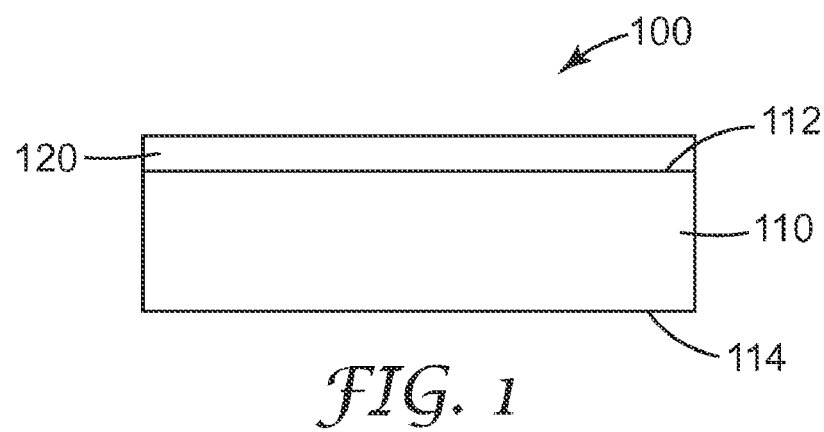
FIG. 1 depicts an electrochromic article in accordance with an embodiment.

Electrolyte compositions include at least one ionic compound, at least one polar solvent, at least one polymerizable compound, at least one nanoparticle based viscosity modifier, at least one chain transfer agent; and at least one initiator.

Electrolyte compositions include at least one ionic compound. The function of the ionic compound is to provide the ionic transport for the composition. Any commonly used ionic compound, as are known to those of skill in the art can be utilized. Examples of such ionic compounds include, but are not limited to, lithium imide, lithium triflate, lithium (bis) trifluoromethanesulfonimide HQ-115 (FLUORAD commercially available from 3M Company, St. Paul, Minn.), lithium tetrafluoroborate, lithium perchlorate, lithium iodide, lithium trifluorocarbonate, lithium nitrate, lithium thiocyanate, lithium hexafluoroarsenate, lithium hexafluorophosphate, lithium methide, and mixtures thereof. In one embodiment, lithium perchlorate is utilized.

In one embodiment, the ionic compound is present in the electrolyte composition at a level that is greater than 1 wt-%. In another embodiment, the ionic compound is present in the electrolyte composition at a level that is from 1 wt-% to 10 wt-%. In yet another embodiment, the ionic compound is present in the electrolyte composition at about 9 wt-%.

Electrolyte compositions also include at least one polar solvent that functions as a plasticizer. Polar solvents that are useful in electrolyte compositions generally provide fluidity to the composition. In an embodiment of the electrolyte compositions, the polar solvent has a low vapor pressure. In one embodiment, a polar solvent with a vapor pressure of not greater than 0.5 mm Hg at 20° C. can be utilized. In an embodiment, the polar solvent also has no adverse effects on the film forming properties of the electrolyte composition. In an embodiment, the dielectric constant of the at least one polar solvent is high. In one embodiment, the dielectric constant is high enough to easily dissolve the lithium salts and disassociate the salt to its ions. The solvent should also be chosen so that it minimizes the binding between the plasticizer and the lithium ions, so that the lithium ions can freely move to and from the vicinity of the electroactive chemical during the redox process. In one embodiment, the at least one polar solvent can also function to wet the surface on which the electrolyte layer is applied.

Exemplary polar solvents include, but are not limited to, alkylene carbonates. Exemplary alkylene carbonates that can be utilized include, but are not limited to, propylene carbonate, ethylene carbonate, butylene carbonate, glycerine carbonate, and combinations thereof. In one embodiment, a combination of propylene carbonate and ethylene carbonate is utilized in an electrolyte composition. In an embodiment that utilizes a mixture of propylene carbonate and ethylene carbonate, a mixture of 1:1 (propylene carbonate:ethylene carbonate) to 5:1 by weight can be used. In one embodiment, a 4:3 mixture of propylene carbonate:ethylene carbonate can be used. Other exemplary solvents include γ-butyrolactone, ionic liquids, and oligomeric polyethylene glycol (PEG).

In one embodiment, the at least one polar solvent is present in the electrolyte composition at a level that is greater than 25 wt-%. In another embodiment, the at least one polar solvent is present in the electrolyte composition at a level that is greater than 50 wt-%. In yet another embodiment, the at least one polar solvent is present in the electrolyte composition at a level that is greater than 55 wt-%.

Electrolyte compositions also include at least one polymerizable material. The polymerizable material functions to make the electrolyte composition more like a solid after the composition is cured. In one embodiment, the polymerizable material is a UV curable polymerizable material. It will be understood by those of skill in the art, having read this specification, that more than one polymerizable material could be utilized in an electrolyte composition.

Examples of polymerizable material that may be utilized in electrolyte compositions include, but are not limited to, acrylates, methacrylates, and diacrylates such as poly(ethylene glycol)methyl ether acrylate, poly(ethylene glycol)methyl ether diacrylate, poly(ethylene glycol)methyl ether methacrylate, and combinations thereof. One embodiment utilizes poly(ethylene glycol)methyl ether acrylate having an average $M_n$ of about 454 (commercially available from Sigma-Aldrich, St. Louis, Mo.) as the at least one polymerizable material.

In one embodiment electrolyte compositions include greater than 15 wt-% of the polymerizable material. In another embodiment, the electrolyte composition includes greater than 25 wt-% of polymerizable material. In yet another embodiment, the electrolyte composition includes from 25 wt-% to 35 wt-% of polymerizable material.

Electrolyte compositions also include at least one chain transfer agent. Generally, a chain transfer agent is a compound that functions to stop the growth of a polymer chain by yielding an atom to the active radical at the end of the growing chain, and thereby functions to control the degree of polymerization. In electrolyte compositions, controlling the polymer size functions to minimize blocking of the nanopores in the cured electrolyte, control the viscosity of the cured electrolyte composition, and can also prevent or minimize phase separation of the electrolyte composition components.

It will be understood by those of skill in the art, having read this specification, that more than one chain transfer agent can be utilized in an electrolyte composition. Examples of chain transfer agents include, but are not limited to thiols. Specific exemplary chain transfer agents include, but are not limited to methyl 3-mercaptopropionate, and isooctylthioglycolate (IOTG), and alkyl mercaptans. In on embodiment, IOTG offers an advantage because it has minimal odor when compared with other chain transfer agents.

In one embodiment, an electrolyte composition includes from 0.05 wt-% to 5 wt-% of a chain transfer agent. In another embodiment an electrolyte composition includes from 0.05 wt-% to 1 wt-% of a chain transfer agent. In yet another embodiment, an electrolyte composition includes from 0.05 wt-% to 0.5 wt-% of a chain transfer agent. In a further embodiment, an electrolyte composition includes 0.1 wt-% of a chain transfer agent.

Electrolyte compositions also include a nanoparticle based viscosity modifier. It will be understood by those of skill in the art, having read this specification, that more than one nanoparticle based viscosity modifier can be utilized in an electrolyte composition. The nanoparticle based viscosity modifier functions to increase the viscosity of the cured electrolyte composition. In one embodiment, the nanoparticle based viscosity modifier increases the viscosity of the cured electrolyte composition while maintaining an acceptable ionic conductivity. The nanoparticle based viscosity modifier can also be chosen so that the dispersability of the material in the composition is acceptable from a processing standpoint. In one embodiment, the nanoparticle based viscosity modifier does not substantially modify the optical properties of the electrolyte. The viscosity of the electrolyte composition can also be adjusted depending on the ultimate coating method that will be used to apply it.

In one embodiment, the nanoparticle based viscosity modifier has an average diameter that is greater than 5 nm. In another embodiment, the nanoparticle based viscosity modifier has an average diameter that is less than 100 nm. In one embodiment, the nanoparticle based viscosity modifier has an average diameter that is from 10 to 15 nm.

Exemplary nanoparticle based viscosity modifiers include, but are not limited to metal oxides, such as fumed silica, and fumed alumina. In one embodiment, the nanoparticle based viscosity modifier can be fumed silica. Fumed silica, as AEROSIL200 is commercially available from Degussa AG (Dusseldorf, Germany). In one embodiment, the nanoparticle based viscosity modifier can be surface modified. One exemplary material for surface treating silica includes methacrylate silane.

In one embodiment, an electrolyte composition includes at least 1 wt-% nanoparticle based viscosity modifier. In another embodiment, an electrolyte composition includes from 5 wt-% to 15 wt-% nanoparticle based viscosity modifier. In yet another embodiment, an electrolyte composition includes from 5 wt-% to 10 wt-% nanoparticle based viscosity modifier.

The nanoparticle based viscosity modifier can also function to increase the adhesion of the electrolyte to the substrate, or layers in a device that it is in contact with. Such adhesion can improve the mechanical stability of a device that is constructed using an electrolyte composition.

Electrolyte compositions also include at least one initiator. The initiators can either be photoinitiators or thermal initiators. In one embodiment, photoinitiators are utilized because they afford the use of UV light to cure the polymerizable material.

Generally, a photoinitiator is a compound that, under absorption of light, undergoes a photoreaction, producing reactive species. Examples of photoinitiators include organic peroxides (e.g., benzoyl peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Examples of suitable commercially available, ultraviolet-activated photoinitiators are sold under the trade designations IRGACURE 651, IRGACURE 184, IRGACURE 369 and IRGACURE 819, all commercially available from the Ciba Geigy Company, Lucirin TPO-L, commercially available from BASF Corp. and DAROCUR 1173 commercially available from Merck & Co. It will also be understood by those of skill in the art, having read this specification, that more than one photoinitiator can be utilized in an electrolyte composition.

In an embodiment that includes a photoinitiator, the electrolyte composition generally includes from 0.01 wt-% to 1 wt-% of the photoinitiator. In one embodiment, from 0.05 wt-% to 0.1 wt-% of a photoinitiator is utilized in an electrolyte composition.

Exemplary thermal initiators that can be utilized generally include peroxides such as acetyl and benzoyl peroxides. Specific examples of thermal initiators that can be utilized include, but are not limited to, 4,4'-azobis(4-cyanovaleric acid), 1,1'-azobis(cyclohexanecarbonitrile), 2,2'-azobis(2-methylpropionitrile), benzoyl peroxide, 2,2-bis(tert-butylperoxy)butane, 2,5-bis(tert-butylperoxy)-2,5-dimethylhexane, bis[1-(tert-butylperoxy)-1-methylethyl]benzene, tert-butyl hydroperoxide, tert-butyl peracetate, tert-butyl peroxide, tert-butyl peroxybenzoate, cumene hydroperoxide, dicumyl peroxide, lauroyl peroxide, peracetic acid, and, potassium persulfate, Electrolyte compositions can also optionally include light scattering particles, such as 200-400 nm $TiO_2$ particles. The addition of light scattering particles function to make the electrolyte reflective, which can then form a white background for a reflective display device. Other additives, not specified herein, can also be added to electrolyte compositions in order to provide certain characteristics to the compositions.

One of skill in the art, having read the specification would know how to formulate an electrolyte composition. One embodiment includes initially mixing the ionic compound, polar solvent and polymerizable material together; adding the nanoparticle based viscosity modifier; and then adding the chain transfer agent, photoinitiator and optional components. In some embodiments, the components can be added to the composition in different orders. In some embodiments, the composition can be sonicated during the mixing in order to disperse the solution.

One exemplary method of formulating the composition includes the following. First, the polar solvent, for example a propylene carbonate/ethylene carbonate (4:3), is dried and the polymerizable material, for example polyethylene glycol monomethyl ether acrylate is added to the solvent in an appropriate container. Next, the ionic compound, for example $LiClO_4$, is added to the container, and the mixture is stirred until the ionic compound is completely dissolved. Next, a portion (about ⅗ of the total to be added) of the nanoparticle based viscosity modifier, for example Aerosil200 silica is slowly added over the course of about 30 minutes. The solution is stirred until it is completely fluid. After the rest of the viscosity modifier has been added, the solution is then stirred further. Portions of the material can be manually reincorporated into the formulation if necessary. The mixture is then ultrasonicated, if needed, until it reaches minimal viscosity. Finally, the chain transfer agent and the optional photoinitiator, for example IOTG and TPO-L, respectively, are added and the solution is stirred until homogeneous.

After the electrolyte composition has been formulated, it is cured before it can function as intended in an electrochromic device. In some embodiments, the electrolyte composition is incorporated into at least a portion of an electrochromic device before it is cured. In another embodiment, the electrolyte composition is partially cured before it is incorporated into at least a portion of an electrochromic device. In one embodiment, the electrolyte composition is applied to a working electrode, a counter electrode, or both the working electrode and the counter electrode before it is fully cured. In one embodiment, the electrolyte composition is applied to a working electrode, a counter electrode, or both the working electrode and the counter electrode in an uncured state.

Generally, the electrolyte composition can be applied to the surface of the working electrode, counter electrode, or both using coating methods that would be known to one of skill in the art having read this specification. In some embodiments, die coating, spread coating, knife coating, or screen printing are utilized.

If the initiator is a photoinitiator, the electrolyte composition can be cured using UV light. If the initiator is a thermal initiator, the electrolyte composition can be cured using increased temperatures. As used herein, a cured electrolyte composition refers to electrolyte compositions that have been partially cured or fully cured. Generally speaking, an electrolyte composition that is to be UV cured, can be cured in less than 5 minutes using a UV source with a power of at least 1 $mW/cm^2$. In another embodiment, an electrolyte composition can be cured in greater than 1 minute using a UV source with a power of at least 10 $mW/cm^2$. In yet another embodiment, an electrolyte composition can be cured in 1 to 2 minutes using a UV source with a power of at least 5 $mW/cm^2$. It will of course be understood by one of skill in the art that the time of curing is dependent on the power of the UV source and vice versa.

In one embodiment, an electrolyte composition that has been cured generally has a conductivity of at least 1 mS/cm (milli-siemens/centimeter). In another embodiment, a cured electrolyte composition has a conductivity that is at least 10 mS/cm.

In one embodiment, an electrolyte composition that has been cured generally has a viscosity of at least 50 Poise. In another embodiment, a cured electrolyte composition has a viscosity that is from 50 to 1000 Poise.

Electrolyte compositions allow the fabrication of electrochromic devices that are durable but maintain high performance. The high performance of the device is made possible by the maintenance of the high ionic conductivity. Devices that utilize electrolyte compositions will also generally have a decreased possibility of leakage and a decreased possibility of electrolyte movement, which causes shorting. Electrolyte compositions also have a low viscosity before curing, which makes fabrication of devices that include them easier. It is also an advantage that the composition does not include volatile solvents that have to be eliminated.

Electrolyte compositions can be utilized in fabricating electrochromic articles. One embodiment of an electrochromic article 100 is depicted in FIG. 1, and includes a working electrode 110, and an electrolyte layer 120. The working electrode 110 can be fabricated as is well known to those of skill in the art. Exemplary methods of forming working electrode 110 include, but are not limited to printing, electrodeposition, electrophoretic deposition, sputtering, and vapor coating. U.S. Pat. No. 5,825,526 and U.S. Pat. No. 5,919,571, the disclosures of which are incorporated herein by reference, provide two specific examples of methods of fabricating a working electrode. In another embodiment, the working electrode 110 can be formed as disclosed in the patent applications entitled "Electrochromic Device" with "Electrochromic Device", filed on the same day as this application, the disclosures of which are incorporated herein by reference. As seen in FIG. 1, the working electrode 110 has a working electrode working surface 112 and a working electrode substrate surface 114. The electrolyte layer 120 includes the electrolyte composition discussed above. In one embodiment, the electrolyte composition is fully cured, in another embodiment, it is partially cured, and in yet another embodiment, the electrolyte composition is fully uncured.

In one embodiment, the electrolyte layer 120 is from 1 μm to 1000 μm thick. In another embodiment, the electrolyte layer 120 is from 10 μm to 500 μm thick. In yet another embodiment, the electrolyte layer 120 is from 25 μm to 200 μm thick.

Figure 2:
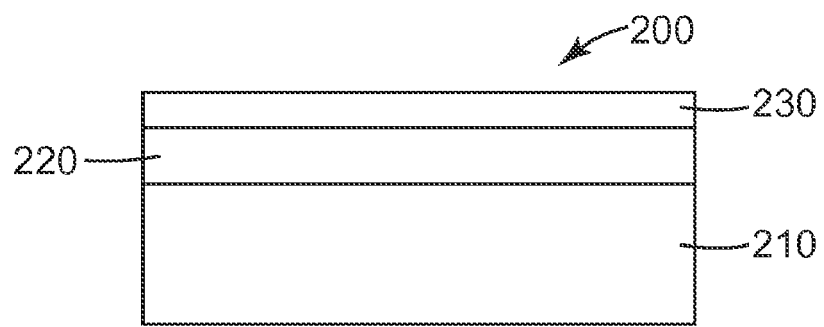
FIG. 2 depicts an electrochromic article in accordance with an embodiment.

FIG. 2 depicts yet another electrochromic article. The electrochromic article 200 of FIG. 2 includes a working electrode 210, an electrolyte layer 220, and a release liner 230. The working electrode 210 and the electrolyte layer 220 can be as discussed above. The release liner 230 can be formed of any useful material such as, for example, polymers or paper and may include a release coat. Suitable materials for use in release coats include, but are not limited to, fluoropolymers, acrylics and silicones designed to facilitate the release of the release liner from the electrolyte layer. Such an embodiment could be useful if the electrode/electrolyte were manufactured and sold separately from the remaining components of an electrochromic device.

Figure 3:
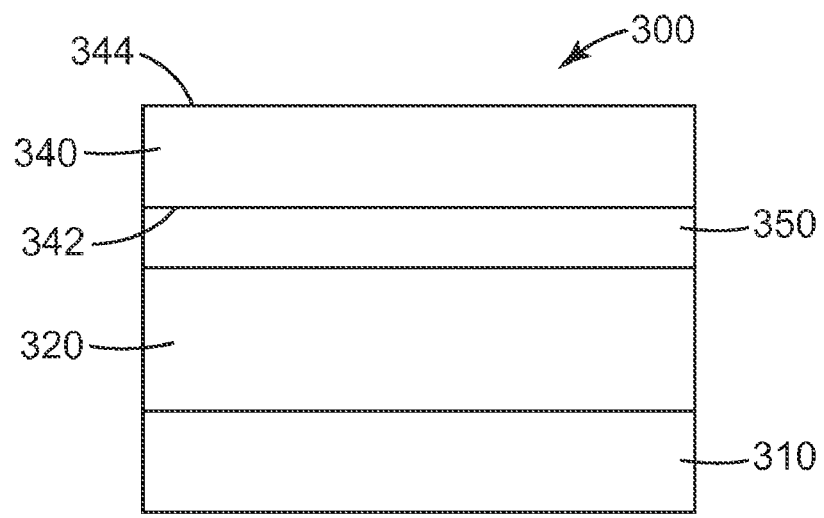
FIG. 3 depicts an electrochromic article in accordance with an embodiment.

FIG. 3 depicts a further electrochromic article. The electrochromic article 300 depicted in FIG. 3 includes a working electrode 310, an electrolyte layer 320, a counter electrode 340, and an optional reflective layer 350. The working electrode 310, and the electrolyte layer 320 are as discussed above. The counter electrode 340 can be fabricated as is well known to those of skill in the art. Generally, the counter electrode is a layer or layers that provide the charges which enable the redox counterpart to the process occurring at the working electrode. U.S. Pat. No. 5,825,526 and U.S. Pat. No. 5,919,571, the disclosures of which are incorporated herein by reference, provide two specific examples of methods of fabricating a counter electrode. In one embodiment, the counter electrode includes antimony doped zinc oxide (AZO), as discussed in the patent applications entitled "Electrochromic Device" and "Electrochromic Device", filed on the same day as this application, the disclosures of which are incorporated herein by reference.

As seen in FIG. 3, the counter electrode 340 includes a counter electrode working surface 342 and a counter electrode substrate surface 344. The optional reflective layer 350 is positioned between the counter electrode 340 and the electrolyte layer 320. The reflective layer 350 functions to separate the two electrodes, allow the passage of ionic electrolyte and maintain a white background for a reflective display device. In one embodiment, the reflective layer includes material that is insulating and scatters light. In one embodiment, the reflective layer includes a layer of alumina coated $TiO_2$. In one embodiment, the reflective layer is from 10 μm to 200 μm thick. In yet another embodiment, the reflective layer is from 25 μm to 100 μm thick. The reflective layer 350 can also be replaced with a reflective membrane as discussed in the patent applications entitled "Electrochromic Device-"and "Electrochromic Device", filed on the same day as this application, the disclosures of which are incorporated herein by reference.

One of skill in the art will also understand, having read this specification, that the electrolyte layer need not actually be a defined layer within a device, but instead the material making up the electrolyte layer can be dispersed within the other portions of the device. For example, the material of the electrolyte layer can be dispersed within the reflective layer, the working electrode, the counter electrode, or some combination thereof.

As discussed above, the electrolyte layer can be formed by applying electrolyte composition to the working electrode and/or to the counter electrode and then putting the two portions together to form the electrolyte layer of the ultimate device. It will also be understood by one of skill in the art, that a working electrode and an electrolyte layer; and a counter electrode and an electrolyte layer could both be covered with a release liner and then subsequently put together after the release liners are removed. In another embodiment, a working electrode and electrolyte layer with a release liner can be attached to a counter electrode (without any electrolyte composition) after the release liner is removed from the electrolyte layer. In embodiments where the working electrode and electrolyte layer are joined with another portion of an electrochromic device, it is generally desired that the electrolyte layer (whether fully cured, partially cured, or fully un-cured) remain fluid enough so that the material of the electrolyte layer can "wet" the surface that it is being adjoined to. This property can be enhanced if the polar solvent has a low vapor pressure so that the solvent does not evaporate from the electrolyte layer before adjoining it to the remainder of the device.

A method of assembling an electrochromic device that includes providing an electrolyte composition as discussed above, coating the electrolyte composition onto the working electrode working surface, providing a counter electrode having a counter electrode working surface, and assembling the electrochromic device by placing the electrolyte composition coated working electrode working surface in contact with the counter electrode working surface is also provided. The assembly method can also include curing the electrolyte composition. In one embodiment, the electrolyte composition is cured fully, and in another embodiment it is partially cured. In some embodiments, the curing can occur before the assembly step, after the assembly step, or both before and after the curing step. An embodiment also includes providing a release liner on the electrolyte coated working electrode working surface. Another embodiment also includes coating the electrolyte composition onto the counter electrode working surface, and in such a case a release liner can also optionally be provided on the electrolyte coated counter electrode working surface. In embodiments that include release liners being placed on one or both of the working electrode working surface or counter electrode working surface, the release liner is generally removed before the electrochromic device is assembled.

EXPERIMENTAL

Materials

Poly(ethylene glycol)methyl ether acrylate was obtained from Sigma-Aldrich (St. Louis, Mo.) and was used with out further purification.

Propylene carbonate and ethylene carbonate mixture was obtained from Sigma-Aldrich (St. Louis, Mo.) and was dried over molecular sieves before use.

Aerosil2000 fumed silica was obtained from Degussa AG (Dusseldorf, Germany) and was dried under vacuum at 150 degrees C. for at least 3 hours before use.

IRG819 was obtained from Ciba Specialty Chemicals (Basel, Switzerland).

TPO-L was obtained from BASF AG (Ludwigshafen Germany).

Methyl-3-mercaptopropionate and IOTG were obtained from Sigma-Aldrich (St. Louis, Mo.).

Lithium perchlorate ($LiClO_4$) was obtained from Sigma-Aldrich (St. Louis, Mo.).

Potassium chloride (KCl) was obtained from Sigma-Aldrich (St. Louis, Mo.).

Indium tin oxide (ITO) coated substrates (both glass and PET) were obtained from Sheldahl (Northfield, Minn.).

ST-01 titania nanopowder (anatase, 7 nm) was obtained from Ishihara USA (San Francisco, Calif.).

P25 titania nanopowder (anatase/rutile, 21 nm) from Degussa AG (Dusseldorf, Germany)

Modified viologen (1,1'-bis(2-phosphonoethyl)-4,4'-bipyridinium dichloride), was synthesized by adding 4,4'-bipyridine (4.4 g) and diethyl-2-bromoethyl phosphonate (15.0 g) to water (75 mL), and refluxing the reaction mixture for 72 hours. After the reaction mixture was allowed to cool, concentrated hydrochloric acid (50%, 75 mL) was added and the mixture was refluxed for another 24 hours. The product was recovered by concentrating the reaction mixture to 50 mL, adding 200 mL 2-propanol dropwise, and stirring the mixture, on ice, for an hour, followed by filtering. The white crystalline product was washed with cold 2-propanol and air dried to give the redox chromophore 1,1'-bis(2-phosphonoethyl)-4,4'-bipyridinium dichloride.

Diethylene glycol monoethyl ether was obtained from Alfa Aesar (Ward Hill, Mass.).

METHOCEL E4M was obtained from Dow Chemical Corporation (Midland Mich.).

Celnax CX-Z641M (Dispersion of 60 wt % antimony doped zinc oxide 20 nm particles in Methanol) was obtained from Nissan Chemical America Corporation (Houston Tex.).

The AZO paste was prepared by adding the desired amount of the METHOCEL E4M solution (10% Methylcellulose 4M in DI water) and diethylene glycol monoethyl ether solvent into a glass vial/jar containing a magnetic stir bar. The METHOCEL binder and solvent generally required a minimum of 8 hours stirring at 90-100° C., the contents were therefore stirred overnight (14-18 hours). Next the Celnax CX-Z641M (Dispersion of 60 wt % antimony doped Zinc Oxide 20 nm particles in methanol was added to the mixture. The solution was stirred an additional 7 hours at 90° C. The paste was allowed to cool before screen printing.

Alumina coated $TiO_2$ particles (CR-60 from ISK, ~300 nm) were obtained from Ishihara USA (San Francisco, Calif.).

Example 1

Preparation of Electrolyte Compositions

An electrolyte composition according to table 1 below was made.

TABLE 1

Composition of electrolyte compositions

| | Poly(ethylene glycol) methyl ether acrylate | Propylene carbonate/ Ethylene carbonate (4:3 by weight) | Aerosil2000 fumed silica | $LiClO_4$ | IRG819 | Methyl-3-mercaptoproprionate |
|---|---|---|---|---|---|---|
| Weight (g) | 7.4 | 14 | — | 2.28 | 0.02 | 0.03 |

Compositions having 0, 3, 5, 8, 10, and 15 wt % Aerosil2000 fumed silica (based on weight of other 5 components of the composition) were formulated.

Poly(ethylene glycol)methyl ether acrylate, propylene carbonate/ethylene carbonate and $LiClO_4$ were initially mixed. Next, Aerosil200 fumed silica was added slowly under stirring. For electrolyte compositions with more than 5 wt-% Aerosil2000 fumed silica added, ultrasonication was used to disperse the silica nanoparticles. After sufficient mixing and dispersing, IRG819 and methyl-3-mercaptopropionate were added and the solution was mixed.

Example 2

Properties of Electrolyte Composition

Figure 4:
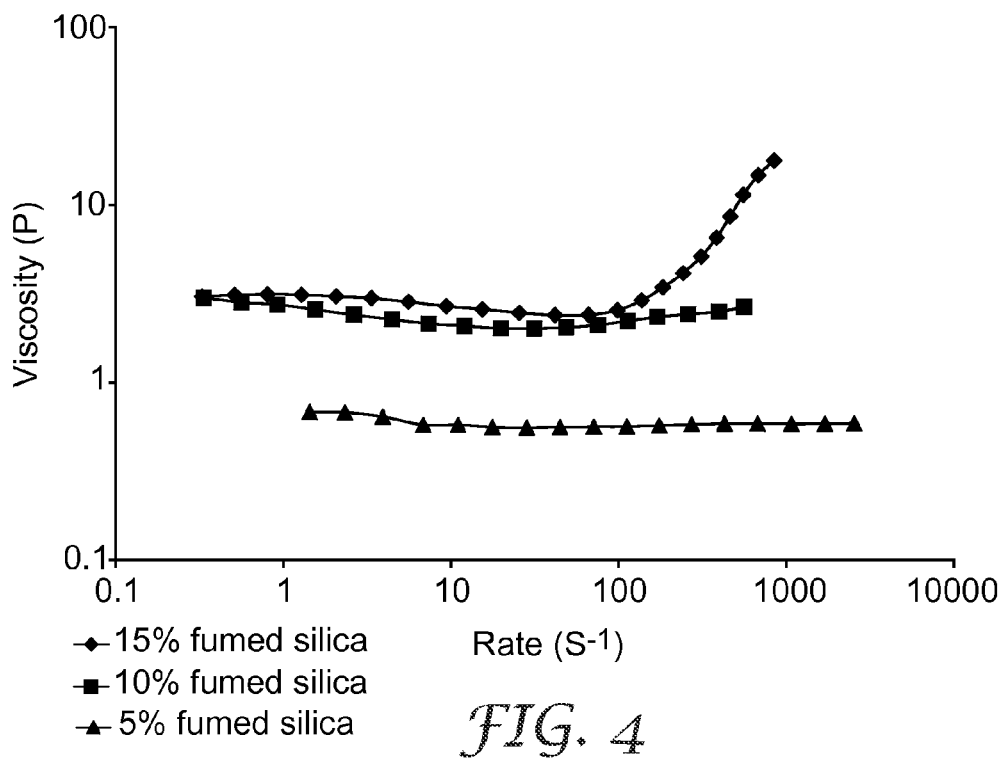
FIG. 4 shows shear viscosity measurements of electrolyte compositions before curing.

The shear dependent viscosity of the electrolyte compositions with different amounts of Aerosil200 fumed silica is shown in FIG. 4. The measurements were done at 25 degrees C. with a DSR 200 (Rheometric Scientific, USA). In the main range of the shear rate the electrolytes behave like Newtonian fluids with relatively low viscosity.

Example 3

Properties of Cured Electrolyte Composition

The changes in viscosity were measured during curing of electrolyte compositions having different amounts of Aerosil2000 fumed silica using an ARES rheometer from TA Instruments (New Castle, Del.) with a UV Curing Accessory. The liquid solution was loaded into 20 mm quartz plates of the rheometer with a thickness of 0.25 mm at 25° C.

Figure 5:
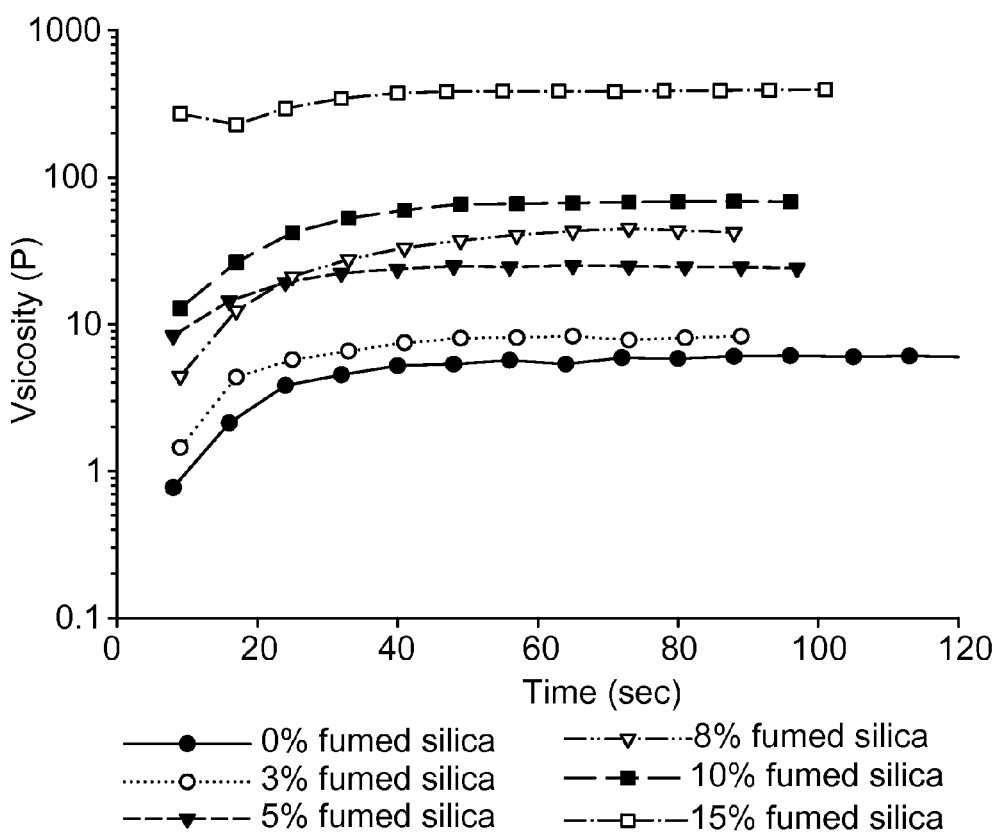
FIG. 5 shows the viscosity as a function of UV exposure time for various electrolyte compositions.

The UV Curing Accessory has a UV light source with high-pressure mercury lamp and a build in radiometer. A strain amplitude of 5% and a sinusoidal oscillation at 6.28 rad/sec (1 hertz), and 5 mwatt-$cm^2$ UV intensity were used. The viscosity of the electrolyte compositions with different amounts of silica were measured by DSR 200 at 25° C. The results are shown in FIG. 5. As evidenced by FIG. 5, it takes less than 1 minute to fully cure the electrolyte compositions. The viscosity of the electrolyte with 15% wt fumed silica reached about 400 Poise after curing.

Example 4

Conductivity of Cured Electrolyte Compositions

The ionic conductivity of the cured electrolyte compositions was measured by etching 2"×2" ITO glass slides (~50 ohm/sq) to 1"×2" stripes. Two such stripes were placed facing each other to form a 1" square overlapping area. Electrolyte compositions were filled in between the two electrode surfaces. 45 μm glass spacer beads were added in the electrolyte compositions to maintain a constant gap between the two electrode surfaces. Electrolyte compositions with 5, 10, and 15 wt-% Aerosil2000 fumed silica were placed between the electrodes and cured under UV (Black-Ray model XX-15 BLB 365 nm; power ~3 mW/$cm^2$) for 15 minutes each and then sealed around the edge with 3M Scotch-Weld DP-100 Epoxy adhesive (3M St. Paul, Minn.). A reference cell with similar construction was filled with 0.01 mole/kg $KCl/H_2O$ solution and was used to obtain the cell constant. AC impedance measurements at 25 degrees C. were used to deduce the ionic conductivity of the cured electrolyte. The measured results are shown in table 2 below.

TABLE 2

Conductivity of cured electrolyte compositions

| Wt-% fumed silica | Conductivity (mS/cm) |
|---|---|
| 5% | 29.7 |
| 10% | 22.8 |
| 15% | 25.1 |

Example 5

Formation of Electrochromic Device

The working electrode was formed as follows. 25% wt ST-01 nanopowder was shear mixed into 50 mM modified viologen aqueous solution. 5% wt P25 nanopowder was then added into the same dispersion under shear mixing. The resulting mixture was then run through a Microfluidizer® at 20,000 to 30,000 PSA with up to 16 passes. This dispersion was then formulated into a screen printable paste that included 48.5 wt-% of the dispersion prepared above, 39.3 wt-% of diethylene glycol monoethyl ether, 9.7 wt-% of a 10 wt-% METHOCEL E4M in water solution, and 2.4 wt-% 1 N $NH_4OH$.

The paste from above was used to screen print a 1"×1" square on a pre-cleaned (rinsed with isopropyl alcohol and DI water) ITO/PET (100 ohm/sq) substrate. It was then dried at 80° C. for 5 minutes, rinsed in methanol at 40° C. for 5 minutes and dried at 80° C. for another 5 minutes. The dried film was semi-transparent and about 6 μm in thickness.

The counter electrode (C.E.) was formed by screen printing a 1"×1" square of an AZO containing paste (prepared as above) on a pre-cleaned (rinsed with isopropyl alcohol and DI water) ITO/PET (100 ohm/sq) substrate. The film was about 7 μm thick and was dried at 80° C. On top of the AZO film a white reflector layer consisting of alumina coated $TiO_2$ particles was deposited by screen printing A few drops of the electrolyte compositions prepared in Example 1 were placed on top of the working and counter electrodes prepared above. Then the two sides were placed together. A rubber roller was used to gently remove excess electrolyte and air bubbles from the device. 45 μm glass spacer beads were used to maintain the gap distance between the two electrodes. Each side of the device was then cured under UV (Black-Ray model XX-15 BLB 365 nm; power ~3 mW/cm$^2$) for about 5 minutes. Ultralight-Weld UV curing adhesive from Dymax (Torrington, Conn.) was then used to seal the device.

Example 6

Performance of Electrochromic Devices

Figure 6:
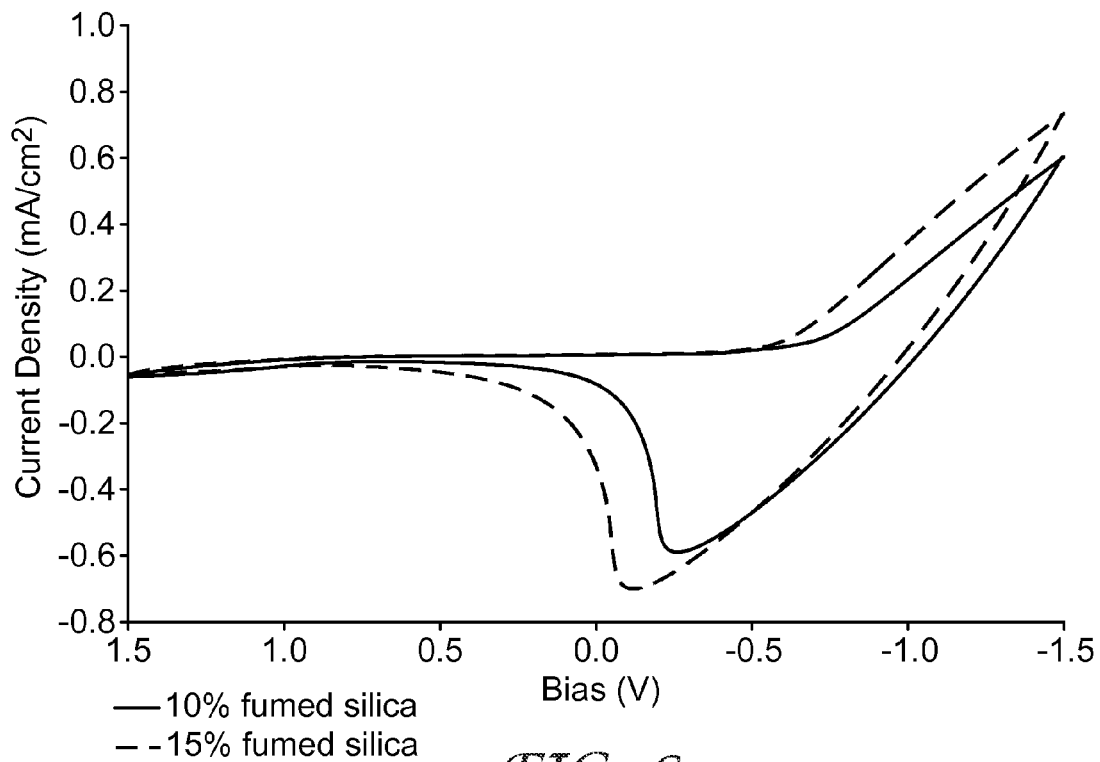
FIG. 6 shows cyclic voltammograms of flexible electrochromic devices.
Figure 7:
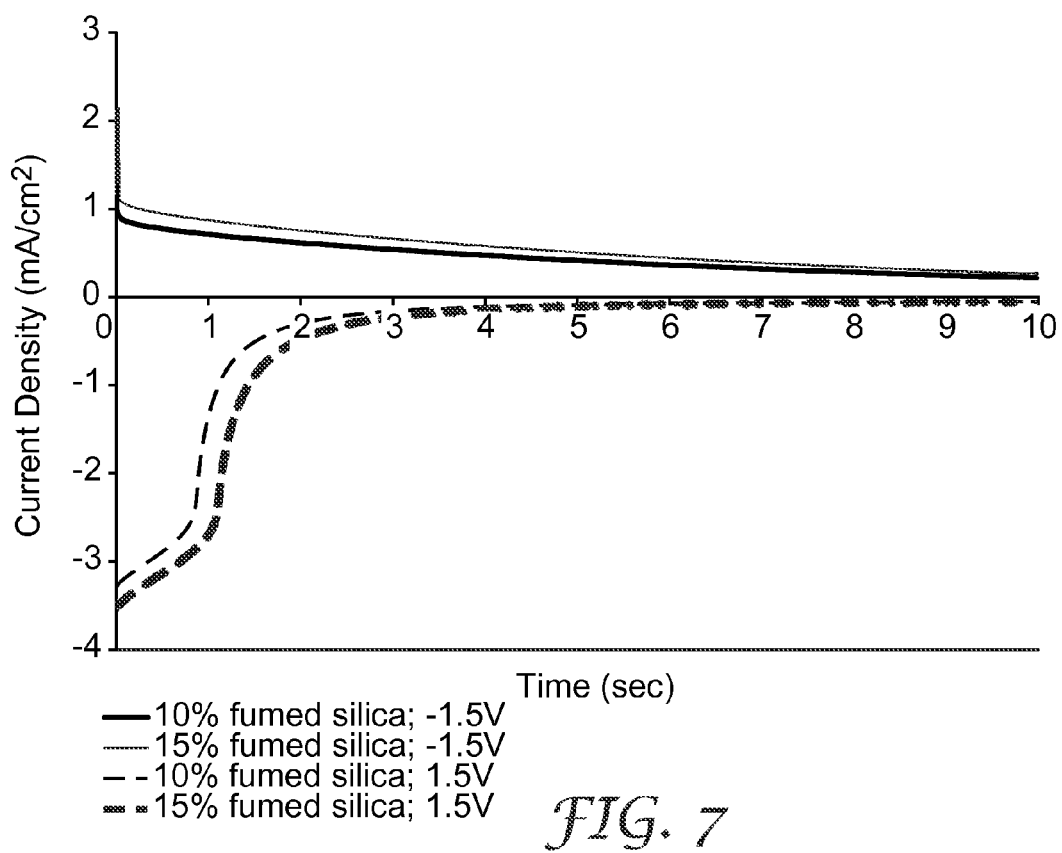
FIG. 7 shows chronoamperometry of flexible electrochromic devices.

Electrochemical characterization of the electrochromic devices using electrolytes fabricated with 10 wt-% and 15 wt-% Aerosil2000 fumed silica was accomplished via cyclic voltammetry and chronoamperometry. The cyclic voltammetry had a scan rate of 200 mV/sec, a scan direction of 1.5 V→−1.5V→1.5V; and the titania working electrode was biased against the counter electrode. The cyclic voltammograms are shown in FIG. 6. In the chronoamperometry, the devices were held at either 1.5V or −1.5V for 10 seconds before switching. The results are shown in FIG. 7.

Figure 8:
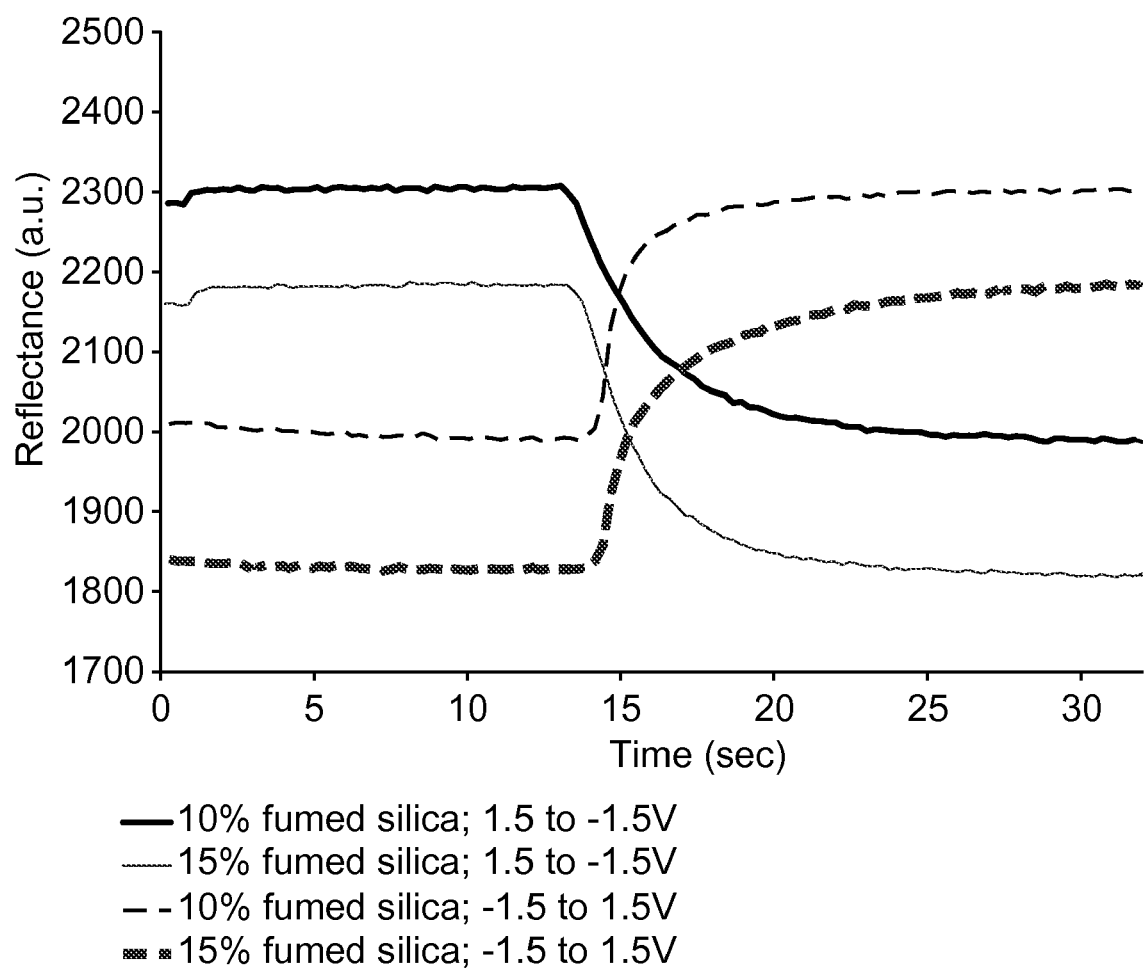
FIG. 8 shows reflectance spectra of flexible electrochromic devices in colored (−1.5V) and bleached states (1.5V).

The visual performance of the electrochromic devices was also investigated. Time resolved reflectance data were obtained and are seen in FIG. 8.

Thus, embodiments of a curable electrolyte are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An electrolyte composition comprising:
   at least one ionic compound;
   at least one polar solvent;
   at least one polymerizable material;
   at least one nanoparticle based viscosity modifier;
   at least one chain transfer agent; and
   at least one initiator.

2. The electrolyte composition according to claim 1, wherein the ionic compound is from 1 wt-% to 10 wt-% of the total electrolyte composition.

3. The electrolyte composition according to claim 1, wherein the at least one polar solvent is an alkylene carbonate.

4. The electrolyte composition according to claim 1, wherein the at least one polar solvent is greater than 25 wt-% of the total electrolyte composition.

5. The electrolyte composition according to claim 1, wherein the at least one polymerizable material is an acrylate, methacrylate, diacrylate, or some combination thereof.

6. The electrolyte composition according to claim 1, wherein the at least one polymerizable material is from 25 wt-% to 35 wt-% of the total electrolyte composition.

7. The electrolyte composition according to claim 1, wherein the nanoparticle based viscosity modifier is fumed silica.

8. The electrolyte composition according to claim 1, wherein the nanoparticle based viscosity modifier is from 5 wt-% to 15 wt-% of the total electrolyte composition.

9. The electrolyte composition according to claim 1, wherein the chain transfer agent is from 0.05 wt-% to 0.5 wt-% of the total electrolyte composition.

10. The electrolyte composition according to claim 1, wherein the at least one initiator is a photoinitiator.

11. The electrolyte composition according to claim 1, wherein the electrolyte composition has a viscosity of not greater than 10 Poise before curing.

12. The electrolyte composition according to claim 1, wherein the composition has a viscosity of not less than 50 Poise after curing.

13. The electrolyte composition according to claim 1, wherein the composition has an ionic conductivity of at least 10 mS/cm.

14. An electrochromic article comprising:
   a working electrode; and
   an electrolyte layer, the layer comprising an electrolyte composition comprising:
      at least one ionic compound;
      at least one polar solvent;
      at least one polymerizable material;
      at least one nanoparticle based viscosity modifier;
      at least one chain transfer agent; and
      at least one initiator,
   wherein the electrolyte layer is on the working electrode.

15. The electrochromic article according to claim 14, wherein the electrolyte composition is at least partially cured.

16. The electrochromic article according to claim 14, wherein the electrolyte layer is from 25 μm to 200 μm thick.

17. The electrochromic article according to claim 14 further comprising a release liner on the electrolyte layer.

18. The electrochromic article according to claim 14 further comprising a counter electrode.

19. The electrochromic article according to claim 18, further comprising a reflective layer positioned between the working electrode and the counter electrode.

20. The electrochromic article according to claim 14, wherein the electrolyte layer has an ionic conductivity of not less than 10 mS/cm.

21. The electrochromic article according to claim 14, wherein the electrolyte layer has a viscosity of not less than 50 Poise.

22. A method of assembling an electrochromic device comprising the steps of:
   providing an electrolyte composition comprising
      at least one ionic compound;
      at least one polar solvent;
      at least one polymerizable material;
      at least one nanoparticle based viscosity modifier;
      at least one chain transfer agent; and
      at least one initiator;

coating the electrolyte composition onto a working surface of a working electrode;

providing a counter electrode having a working surface; and assembling the electrochromic device by placing the electrolyte composition coated working surface of the working electrode in contact with the working surface of the counter electrode.

23. The method according to claim 22 further comprising at least partially curing the electrolyte composition.

24. The method according to claim 23, wherein the step of at least partially curing occurs before the assembly step.

25. The method according to claim 22 further comprising providing a release liner on the electrolyte coated working surface of the working electrode.

26. The method according to claim 25 further comprising removing the release liner from the electrolyte coated working surface of the working electrode before the assembly step.

* * * * *

UNITED STATES PATENT AND TRADEMARK OFFICE
CERTIFICATE OF CORRECTION

PATENT NO. : 7,864,397 B2
APPLICATION NO. : 11/566509
DATED : January 4, 2011
INVENTOR(S) : Junjun Wu It is certified that error appears in the above-identified patent and that said Letters Patent is hereby corrected as shown below:

First Page
Column 1 (U.S. Patent Documents); Line 16; delete "5/2003" and insert -- 9/2003 --, therefor.

Page 2
Column 2 (Other Publications); Line 18; delete "Electrochimicha" and insert -- Electrochimica --, therefor.

Column 3
Line 55; delete "dispersability" and insert -- dispersibility --, therefor.

Column 4
Line 62; delete "persulfate," and insert -- persulfate. --, therefor.

Column 6
Line 34-35; delete ""Electrochromic Device" with "Electrochromic Device"," and insert
-- "Electrochromic Device" with 3M docket number 62353US002 and "Electrochromic Device" with
3M docket number 62144US002, --, therefor.

Column 7
Line 9-10; delete ""Electrochromic Device" with "Electrochromic Device"," and insert
-- "Electrochromic Device" with 3M docket number 62353US002 and "Electrochromic Device" with
3M docket number 62144US002, --, therefor.

Line 27-28; delete ""Electrochromic Device" with "Electrochromic Device"," and insert
-- "Electrochromic Device" with 3M docket number 62353US002 and "Electrochromic Device" with
3M docket number 62144US002, --, therefor.

Signed and Sealed this
Nineteenth Day of April, 2011

David J. Kappos
*Director of the United States Patent and Trademark Office*

Column 8
Line 47; After "Germany)" insert -- . --.

Column 9
Line 29 (Approx.) (Table 1); delete "mercaptoprorionate" and insert -- mercaptopropionate --, therefor.

Column 11
Line 18; After "printing" insert -- . --.

Column 12
Line 61; Claim 22, delete "comprising" and insert -- comprising: --, therefor.